UNITED STATES PATENT OFFICE.

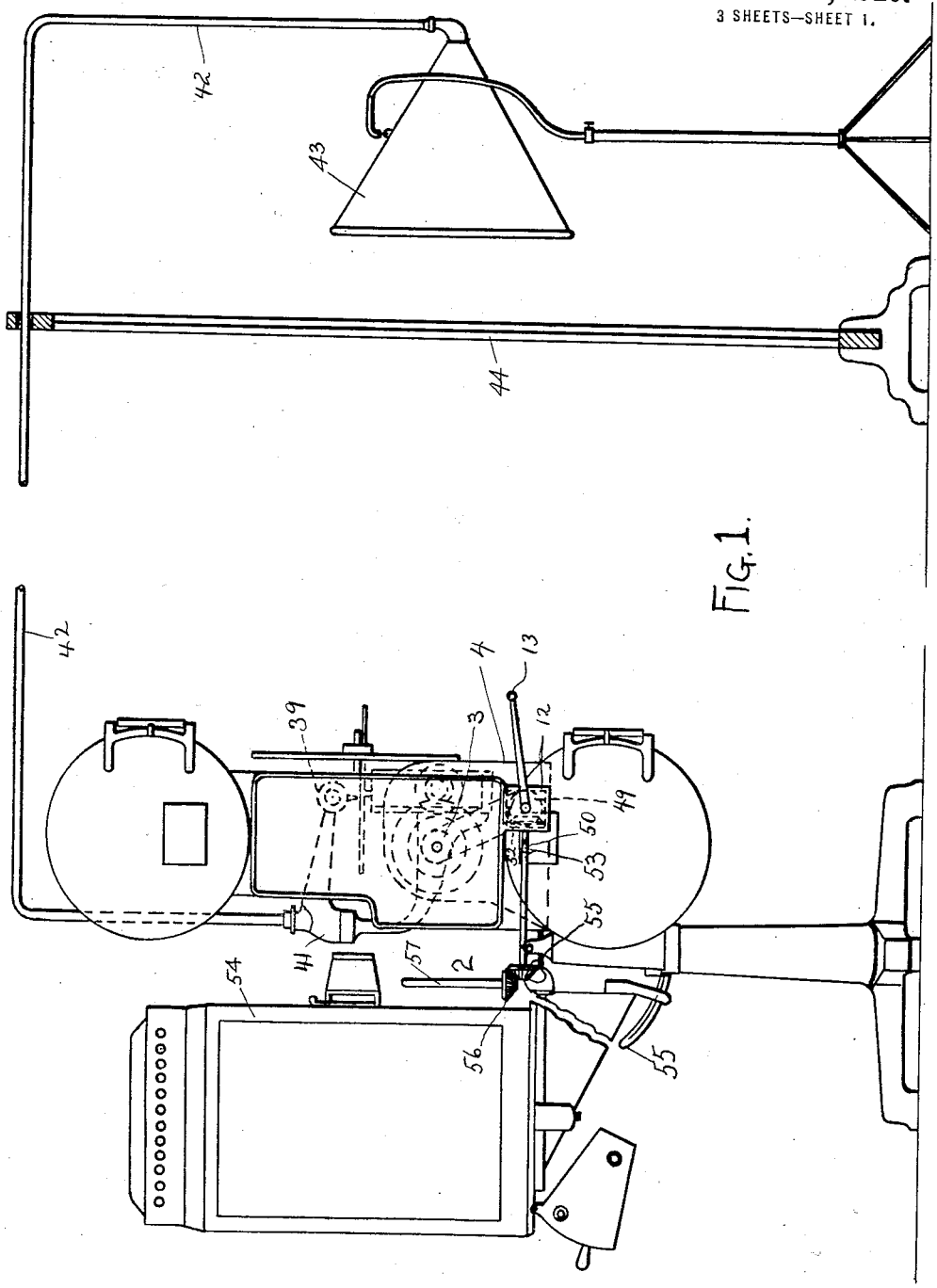

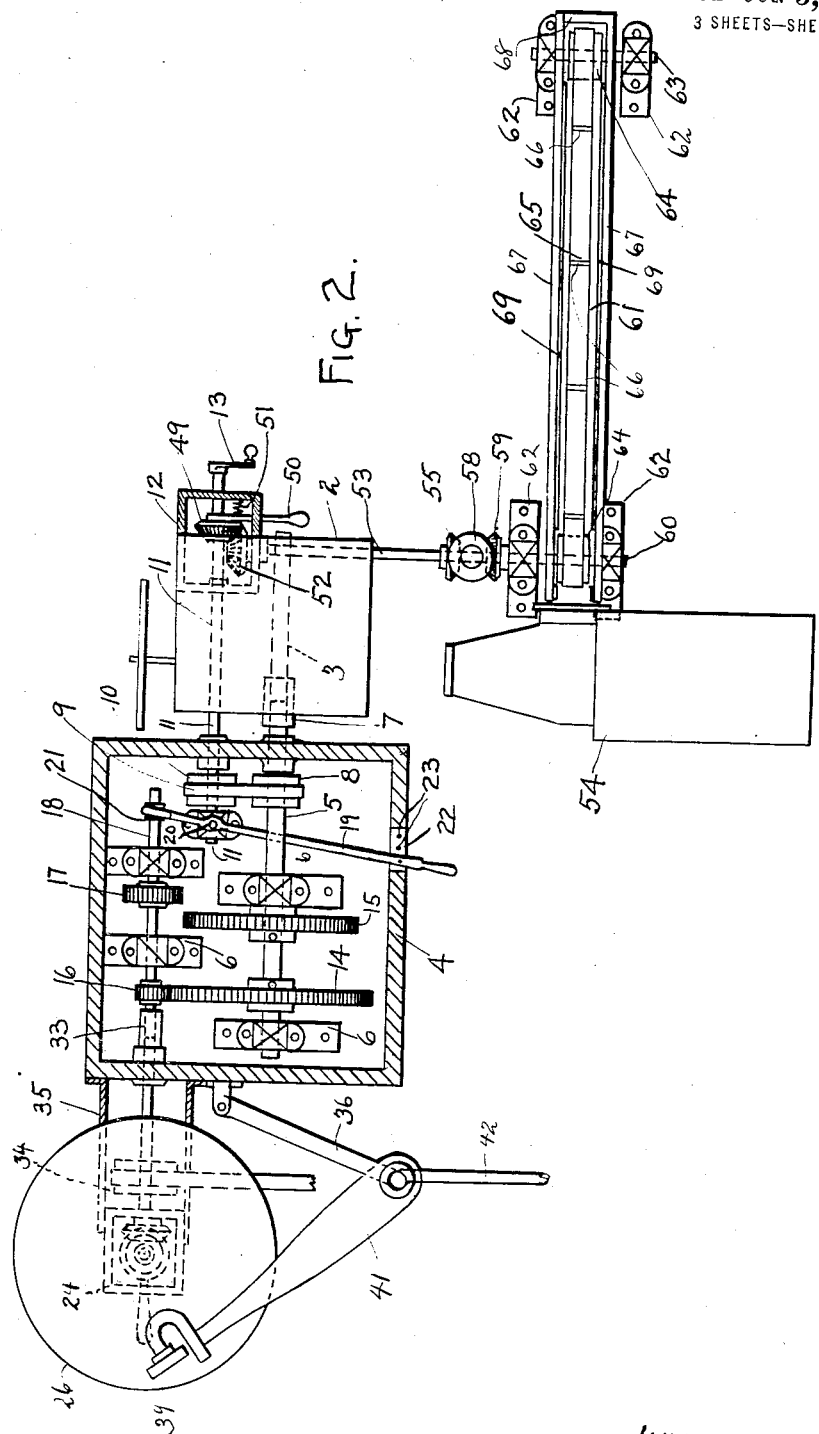

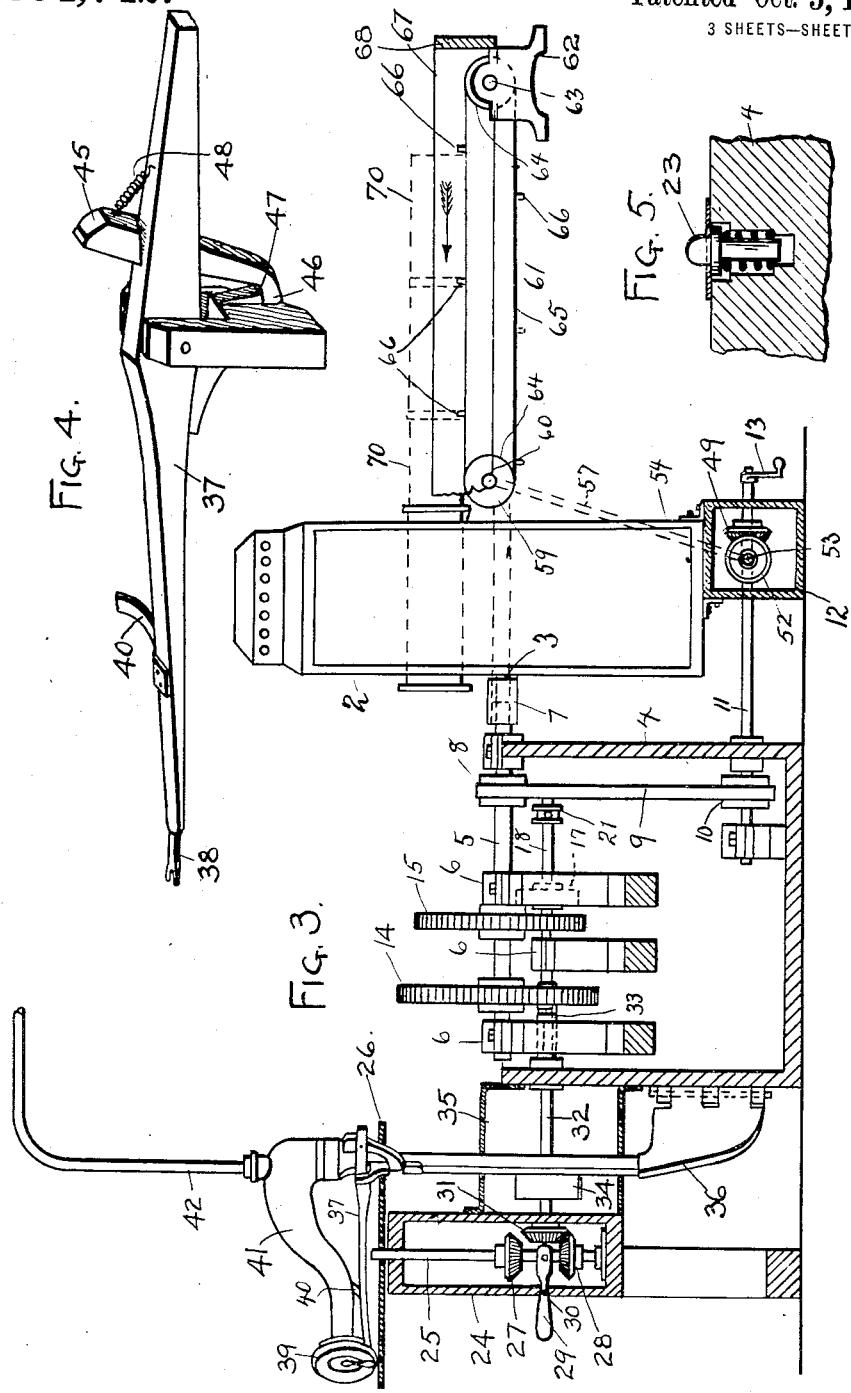

JULIUS G. HARRIS, OF PHILADELPHIA, PENNSYLVANIA.

COMBINED MOTION-PICTURE AND TALKING MACHINE.

1,354,742.  Specification of Letters Patent.  Patented Oct. 5, 1920.

Application filed March 7, 1917. Serial No. 153,163.

*To all whom it may concern:*

Be it known that I, JULIUS G. HARRIS, a citizen of the United States, residing at Philadelphia, in the county of Philadelphia and State of Pennsylvania, have invented new and useful Improvements in Combined Motion-Picture and Talking Machines, of which the following is a specification.

My invention relates to new and useful improvements in combined motion picture and talking machines, and has for its object to provide an exceedingly simple and effective device of this character whereby pictures may be projected upon a screen or surface and the sounds made by the persons, animals or objects, of which the pictures are taken, reproduced simultaneously with the movements of the persons, animals or objects, so that said pictures seem to be making the sounds whereby all things are reproduced true to life.

A further object of the invention is to provide a simple and effective mechanism for combining the necessary elements of a talking machine with a motion picture machine, so that the two may run simultaneously and in unison.

A further object of the invention is to provide means for inserting stereopticon views into the motion picture machine, said means being operated by the same crank that operates the motion picture and talking machines.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which—

Figure 1, is a side elevation of my improved combined motion picture and talking machine, showing one manner in which the sound waves may be discharged in proximity to the screen or other surface, on which the pictures are projected.

Fig. 2, is an enlarged plan view thereof, partly in section to clearly illustrate the construction.

Fig. 3, is a rear elevation with parts thereof broken away and shown in section to illustrate the interior construction.

Fig. 4, is a further enlarged perspective view of the reproducing arm actuating lever; and Fig. 5, is an enlarged detail sectional view of the spring catch.

In carrying out my invention as here embodied 2 represents a motion picture machine of any ordinary and well known construction and having an operating shaft 3. Beside the motion picture machine is arranged a housing 4 which incloses the operating mechanism situated between the motion picture and talking machines, and in this housing adjacent the top thereof is situated a shaft 5 journaled in suitable supports 6 and having one end projecting through the housing, said projecting end of the shaft being connected with the operating shaft of the motion picture machine in some suitable manner as by a splined sleeve 7. This shaft 5 carries a pulley 8, over which runs a belt 9, the same also running over a pulley 10 arranged within the housing and mounted upon a shaft 11, one end of which projects into the housing 4, said shaft 11 running from the operating box 12.

The shaft 11 as plainly shown in Fig. 2, passes entirely through the operating box and on the outer end is mounted an operating handle 13. Within the housing 4, and also mounted on the shaft 5 are a number of different size gears 14 and 15, which mesh with pinions 16 and 17 respectively arranged upon a shaft 18 journaled in suitable supports 6. This shaft 18, besides being revolubly journaled in these supports is also slidably arranged therein, and said shaft is moved longitudinally by means of a suitable lever 19 pivoted as at 20 and coacting with the clutch spool or collar 21 upon said shaft 18. The opposite end of the lever 19 projects through a slot 22 in the housing 4, and in the walls of the housing at this slot are arranged spring catches 23 of any desirable construction, one of which is shown in Fig. 5, and these spring catches coöperate with the lever 19 to hold it in its different adjusted positions.

By shifting the position of the shaft 18 through the medium of the lever 19, said shaft 18 may be brought to a standstill or it may be revolved at different speeds for synchronizing the talking machine record and moving picture machine film, according to the gears and pinions which are in mesh, as will be readily understood. Adjacent the housing 4 and on the side thereof, opposite the motion picture machine is situated the talking machine casing 24. Within the casing 24 is journaled a vertical shaft 25, the upper end of which projects above the casing and carries a turntable 26 for receiving talking machine records, and on this shaft 25 are mounted two opposed bevel gears 27 and 28. The shaft 25 on which these gears are mounted is arranged to slide longitudinally or vertically and the operating means is a lever 29 pivoted to the talking machine casing as at 30 and connected with the shaft 29 in any well known manner as by a clutch collar or spool. These bevel gears 27 and 28 are arranged to mesh with a bevel gear 31 mounted upon a shaft 32 which passes from the talking machine casing 24 to the housing 4 into which it projects, and the end projecting into the housing 4 is connected with the shaft 18 by means of a spline sleeve 33, thereby causing said shafts to revolve in unison, but permitting the shaft 18 to be moved longitudinally.

By providing the shaft 25 with the two gears 27 and 28 either of which may be caused to mesh with the gear 31, the turntable 26 may be revolved in either direction so that records revolving either the right or left hand direction may be used.

The shaft 32 carries a pulley 34, whereby a belt may be used for transmitting power to one or more additional talking machines. The shaft 32 and its pulley is suitably inclosed by a bridge 35 which is connected with the talking machine casing 24 and the housing 4. To the housing 4 adjacent the bridge 35 is hinged a swinging support 36 carrying at its upper end a pivoted lever 37 for supporting, raising and lowering the reproducer arm. This lever has projected from one end a forked extension 38, which surrounds the needle or that portion of the sound box 39 to which the needle is attached, and said lever also carries a cradle 40 in the form of an arcuate metallic band, on which the reproducer arm 41 rests, said reproducer arm being pivoted to the upper end of the swinging support 36 and having connnected therewith a conduit 42 whereby the sound waves may be conveyed to any desirable point as to a horn 43 at the rear of the screen 44.

To the lever 37 is pivoted a latch 45, the nose 46 of which is adapted to engage the underside of a lug 47 when the end of the lever 37 which supports the reproducer arm is to be held in a raised position to keep the needle of the talking machine out of contact with the record. The outer face of this lug 47 is suitably inclined or beveled to permit the nose 46 of the latch 45 to readily ride thereover, and the nose of said latch is normally held in contact with the lug by means of a spring 48. On the shaft 11 within the operating box is splined a beveled gear 49 which may be moved along said shaft by means of a lever 50 projecting through the operating box.

When it is desired to show stereopticon views, the lever 50 is thrown over against the action of the spring 51 to cause the bevel gear 49 to mesh with a similar beveled gear 52 situated within the operating box 12, and mounted upon a shaft 53 which projects rearwardly with its rear end in approximate alinement with the front portion of the lamp house 54 or the channel of said lamp house which receives the stereopticon views or slides. On this outer or rear end of the shaft 53 is arranged a beveled gear 55 meshing with a similar beveled gear 56 on the lower end of the vehicle shaft 57, the upper end of said shaft also carrying a beveled gear 58 which meshes with the beveled gear 59 on the power shaft 60 of the stereopticon slide carrying device 61. This stereopticon slide carrying device comprises a number of supports 62 for the power shaft 60 and another shaft 63, each of which carries a pulley 64 having a belt 65 running over said belt carrying a number of spaced cleats 66.

The upper stand of which belt 65 is partially inclosed by two longitudinal side members or walls 67, and an outer end wall 68 and the inner faces of these side walls are lined with some suitable soft material such as felt 69. The end of the inclosure adjacent the lamp house is opened, so that the stereopticon slides indicated by dotted lines at 70 may be carried along by the belt 65 and inserted in the slide slot of the lamp house.

When it is desired to use the stereopticon the slides or views are inserted in the inclosure through its upper open end and placed on the belt between the cleats in their proper positions for successive exhibition and when desired or at proper intervals in the delivery of the speech or song by the talking machine record, which is being continuously operated by the handle 13, one of the slides 70 will be moved toward and caused to enter the slide channel of the lamp house by operating the lever 50 against the action of the spring 51 causing the gear 49 to mesh with the gear 52 thereby operating the slide carrying device until the desired slide has been forced into the slide channel of the lamp house at which time the lever 50 is released and the action of the spring 51 will move the gear 49 out of mesh with the gear 52 so that the slide carrying device will come to a standstill. The slide carrying device is so located with relation to the slide channel of the lamp house that when a slide is moved toward said lamp house the forward end thereof will enter the slide channel and the continued movement of the belt 65 will force the slide into the lamp house through the medium of one of the cleats 66 at its rear end and when another slide is to be used or inserted in the lamp house the slide carrying device is again operated to cause the next successive slide or view to enter the slide channel as its forward end will engage the rear end of the slide at that time in the lamp house, the slide in said lamp house will be forced out through the other side so that an assistant may readily take hold of the same, remove it from the lamp house and replace it in its regular order on the slide carrying belt or in fact an additional slide carrying device could be provided at the opposite side of the lamp house so that as the slide is pushed from the lamp house it would be conveyed from the lamp house in the same manner as it was conveyed to it.

From the foregoing description it will be seen that by turning the operating handle 13, the moving picture machine and the talking machine will be operated in unison, or the moving picture machine may be operated without the talking machine by causing the pinions 16 and 17 to be disengaged from their respective gears, or again the stereopticon views may be placed in the proper position for exhibiting them upon the screen by causing the pinion 49 to engage the pinion 52 through the medium of the lever 50.

During the operation of the moving picture machine, the talking machine may be brought into immediate operation by pressing upon the latch 45 against the action of the spring 48, so that the nose of said latch will be disengaged from the underside of the lug 47, and this will immediately drop the reproducer arm into the proper position to cause the needle of the sound box to engage the record, and if for any reason it becomes necessary to disengage the needle of the sound box from the record, it is only necessary to force that end of the lever 47 downward which will cause the nose of the latch 45 to engage the underside of the lug 47 and this lever will then support the reproducer arm 41 in its raised position until it is desired to again use the talking machine.

Of course I do not wish to be limited to the exact details of construction as herein shown, as these may be varied within the limits of the appended claims without departing from the spirit of my invention.

Having thus fully described my invention, what I claim as new and useful, is—

1. A combined or motion picture and talking machine comprising a motion picture machine including an operating shaft and a lamp house with a slide channel, a talking machine mechanism including a turn table, a stereopticon slide carrier located adjacent the lamp house in the region of the slide channel and including a conveyer belt, an operating box supported by the motion picture machine, a shaft journaled therein and provided with an operating handle, means for transmitting motion from said last mentioned shaft to the operating shaft of the motion picture machine to the talking machine turn table and means for intermittently transmitting motion from the above named last mentioned shaft to the conveyer belt of said slide carrier.

2. In a device of the character stated the combination of a moving picture machine having an operating shaft, a housing situated adjacent said machine, a shaft journaled within said housing and projecting through one of the walls thereof, means for connecting the operating shaft of the moving picture machine with said last named shaft, gears mounted upon the shaft within the housing, a pulley also mounted on said shaft, another shaft journaled within the housing, pinions mounted on said shaft, means for sliding said shaft to cause either of said pinions to mesh with its respective gear, a talking machine casing, a vertical shaft revolubly and slidably mounted in said casing and projecting through the top thereof, a pair of opposed beveled gears mounted on said shaft, means for moving said shaft longitudinally, another shaft passing between the casing and housing with one end thereof projecting into the casing and the other end into the housing, a splined sleeve for connecting said shaft with the shaft in the housing carrying the pinions, a beveled gear mounted on the shaft between the casing and housing and arranged to cooperate with either of the beveled gears on the vertical shaft, a turntable carried by the outer end of said vertical shaft, a swinging support hinged to the housing, a reproducer arm swiveled thereto, a sound box carried by said reproducer arm, a sound conduit leading from said reproducer arm, a lever pivoted to the swinging support having a cradle for engaging the reproducer arm and provided with a forked extension for engaging the sound box, a lug carried by the swinging support, a spring actuated latch carried by the lever, the nose of which is adapted to engage said lug for holding the lever in that position which will support the reproducer arm in a raised position, an operating box, a shaft journaled therein and projecting into the housing, a pulley on said shaft within the housing, a belt running over the pulleys within the housings for transmitting motion from the shaft passing through the operating box to the gear shaft in the housing, and an operating handle on the outer end of said shaft.

3. In a device of the character stated the combination of a moving picture machine having an operating shaft, a housing situated adjacent said machine, a shaft journaled within said housing and projecting through one of the walls thereof, means for connecting the operating shaft of the moving picture machine with said last named shaft, gears mounted upon the shaft within the housing, a pulley also mounted on said shaft, another shaft journaled within the housing, pinions mounted on said shaft, means for sliding said shaft to cause either of said pinions to mesh with its respective gear, a talking machine casing, a vertical shaft revolubly and slidably mounted in said casing and projecting through the top thereof, a pair of opposed beveled gears mounted on said shaft, means for moving said shaft longitudinally, another shaft passing between the casing and housing with one end thereof projecting into the casing and the other end into the housing, a splined sleeve for connecting said shaft with the shaft in the housing carrying the pinions, a beveled gear mounted on the shaft between the casing and housing and arranged to coöperate with either of the beveled gears on the vertical shaft, a turntable carried by the outer end of said vertical shaft, a swinging support hinged to the housing, a reproducer arm swiveled thereto, a sound box carried by said reproducer arm, a sound conduit leading from said reproducer arm, a lever pivoted to the swinging support having a cradle for engaging the reproducer arm and provided with a forked extension for engaging the sound box, a lug carried by the swinging support, a spring actuated latch carried by the lever, the nose of which is adapted to engage said lug for holding the lever in that position which will support the reproducer arm in a raised position, an operating box, a shaft journaled therein and projecting into the housing, a pulley on said shaft within the housing, a belt running over the pulleys within the housings for transmitting motion from the shaft passing through the operating box to the gear shaft in the housing, an operating handle on the outer end of said shaft, a stereopticon slide carrier, and means for transmitting power from the shaft in the operating box to said slide carrier.

4. In a device of the character stated the combination of a moving picture machine having an operating shaft, a housing situated adjacent said machine, a shaft journaled within said housing and projecting through one of the walls thereof, means for connecting the operating shaft of the moving picture machine with said last named shaft, gears mounted upon the shaft within the housing, a pulley also mounted on said shaft, another shaft journaled within the housing, pinions mounted on said shaft, means for sliding said shaft to cause either of said pinions to mesh with its respective gear, a talking machine casing, a vertical shaft revolubly and slidably mounted in said casing and projecting through the top thereof, a pair of opposed beveled gears mounted on said shaft, means for moving said shaft longitudinally, another shaft passing between the casing and housing with one end thereof projecting into the casing and the other end into the housing, a splined sleeve for connecting said shaft with the shaft in the housing carrying the pinions, a beveled gear mounted on the shaft between the casing and housing and arranged to coöperate with either of the beveled gears on the vertical shaft, a turntable carried by the outer end of said vertical shaft, a swinging support hinged to the housing, a reproducer arm swiveled thereto, a sound box carried by said reproducer arm, a sound conduit leading from said reproducer arm, a lever pivoted to the swinging support having a cradle for engaging the reproducer arm and provided with a forked extension for engaging the sound box, a lug carried by the swinging support, a spring actuated latch carried by the lever, the nose of which is adapted to engage said lug for holding the lever in that position which will support the reproducer arm in a raised position, an operating box, a shaft journaled therein and projecting into the housing, a pulley on said shaft within the housing, a belt running over the pulleys within the housings for transmitting motion from the shaft passing through the operating box to the gear shaft in the housing, an operating handle on the outer end of said shaft, a slide carrier situated adjacent the lamp house of the moving picture machine, said slide carrier consisting of two shafts journaled in suitable supports, pulleys on said shafts, a belt provided with cleats running over said pulleys, side walls or guides, one of which is arranged on each side of the belt, an end wall attached to the outer ends of the side walls, and a suitable lining on the inner surfaces of the side walls, a beveled gear mounted on the end of one of the shafts of the slide carrier, a vertical shaft having a beveled gear on each end thereof, one of said gears meshing with the gear on the shaft of the slide carrier, a horizontal shaft projecting into the operating box, and having a beveled gear on each end thereof, the beveled gear on the outer end meshing with the other beveled gear on the vertical shaft, a beveled gear splined upon the shaft passing through the operating box, a lever for moving said gear into mesh with the other gear on the horizontal shaft, and a spring for normally forcing the splined gear out of mesh with its coöperating gear.

5. In a device of the character stated a reproducer arm support and lifter comprising a pivoted lever carrying a cradle and having a forked extension projecting from one end thereof, a latch pivoted to said lever, means arranged to be engaged by the nose of said latch for holding the forked end of the lever in a raised position and a spring for normally forcing the latch into engagement with said means.

6. In combination a moving picture machine, a talking machine mechanism, the operating box, a shaft journaled in said operating box, means for transmitting motion from said shaft to the talking machine mechanism and the moving picture machine, a pair of parallel short shafts, pulleys mounted thereon, means for transmitting power from the shaft in the operating box to one of said short shafts, a belt running over said pulleys, spaced cleats carried by said belt between which the stereopticon slides are adapted to rest upon the belt, and an inclosure open at the top and the end adjacent the moving picture machine, whereby the slides may be placed upon the belt and inserted in the moving picture machine by the movements of said belt.

In testimony whereof, I have hereunto affixed my signature.

JULIUS G. HARRIS.